Patented Apr. 27, 1937

2,078,418

UNITED STATES PATENT OFFICE 2,078,418

CELLULOSE FILM AND FOIL AND METHOD OF MAKING THE SAME

George Schneider, Montclair, N. J., assignor to Celanese Corporation of America, a corporation of Delaware No Drawing. Application November 1, 1934, Serial No. 751,034

3 Claims. (Cl. 18—57)

This invention relates to artificial materials, such as sheetings, films, foils, etc. that may be translucent, opaque and more especially transparent, the base material of which is a product of the complete or partial de-esterification or saponification of a cellulose ester and more particularly an organic ester of cellulose such as cellulose acetate.

An object of the invention is the economic and expeditious production of sheetings, films, foils and other artificial materials containing the product of the saponification of organic esters of cellulose. Other objects of the invention will appear from the following detailed description of the invention.

By this invention artificial materials especially films and foils may be formed by a direct method and without expensive chemical recovery systems and/or loss of chemicals. The product produced is of excellent clearness and strength.

By the method of preparation according to this invention, many effects may be obtained in the final product that heretofore have not been practicable in similar articles of regenerated cellulose. Thus, a new group of compounds may be incorporated in the material as effect materials that heretofore were prohibited by the solvents and/or liquefying chemicals employed in forming regenerated cellulose.

According to my invention I form sheetings, films, foils and other artificial materials by shaping a solution of an organic ester of cellulose, removing the solvent and saponifying the resultant product. In this manner various effect materials may be incorporated in the article and the saponification or regeneration of the cellulose may be carried to any desired extent with the result that articles having a variety of properties may be formed. In the description and claims, the term sheet-like material or article is to be understood to mean sheetings, films, foils and other like materials.

Any of the organic esters of cellulose are applicable to this invention, for example, cellulose acetate, cellulose formate, cellulose propionate and cellulose butyrate. Although any of the organic esters of cellulose may be employed in this invention, the invention will be described with particular reference to cellulose acetate.

The cellulose ester may be formed by esterifying with an anhydrous organic acid a natural cellulose or cellulose pretreated with organic or inorganic acids. Thus cellulose acetate may be produced by treating cellulose with acetic anhydride in the presence of a catalyst, say sulphuric acid, and a solvent, such as glacial acetic acid, for the ester as it is formed. After esterification, as is usual in the production of yarns, films, etc., the cellulose ester may be allowed to stand containing at least a part of the catalyst to hydrolyze or ripen to a product of the desired acyl value and solubility characteristics, after which the catalyst may be neutralized and the ester precipitated and stabilized.

Other methods of forming the cellulose ester may be employed. In forming articles according to this invention, however, the ripening and stabilizing steps may be dispensed with and the films, foils, etc. formed direct from the esterifying mixture or from the re-dissolved ester precipitated directly after completion of esterification.

In eliminating the ripening and stabilization steps, the method comprises the production of a cellulosic sheet, film, etc. in the most direct fashion conceivable. Thus, a continuous film or foil may be formed by the precipitation or wet method from the primary acetylation mass directly after the acetylation becomes complete and before any water is added as is customary when ripening and hydrolyzing. The wet continuous film or foil may then be completely or partially saponified with alkaline or ammoniacal agents, or even by acid hydrolysis, thus producing a sheet material that is tough and durable and which may be further processed in the same fashion as sheets formed of regenerated cellulose by the viscose method. They may be dried, treated with glycerine and/or coated with wax, etc. for moisture-proofness.

In carrying out my invention, any suitable solution of an ester of cellulose, and more particularly an organic ester of cellulose, is formed into a sheet, film or foil in any suitable manner and after formation de-esterified either totally or partially to form a type of film containing cellulose or a cellulose ester of relatively low acetyl value. Thus, the solution of organic esters of cellulose as it is formed or a solution made by dissolving a precipitated organic ester of cellulose in a suitable solvent may be cast into a film or foil or extruded through suitable orifices into a solvent removing medium to form a film or foil. The film or foil may be further processed to complete or substantially complete removal of volatile solvents.

These films and foils may contain effect materials for lending color, hand, opacity and other desired effects. Examples of such effect materials are dyes or lakes, pigments, filling material, sizes, lubricants, moisture-proofing material, etc.

Many materials may be incorporated into the films or foils by this invention that were not possible by prior methods. Many effect materials may be employed that are unaffected by the solvent employed in forming the solution of the organic ester of cellulose but which were affected by the so-called solvents for cellulose. Further, a larger variety of solvents may be employed in forming films and foils of organic esters of cellulose than when dissolving cellulose. Examples of effect materials are powdered metal, oxides of metals, phosphates and silicates of metals or other salts of metals, starch, cellulose or degradation products of cellulose, lamp black, logwood, or other colored pigments, and dyes, tricresyl phosphate, or other alkyl or aryl phosphates, glycerine glycols or their derivatives or substitution products etc.

The effect materials may be incorporated with the films or foils by adding same to the solution from which the films or foils are formed. The solvent for the organic ester of cellulose should be selected that will have little or no undesired effect upon the effect material yet has a good solvent action on the particular organic ester of cellulose employed.

Any suitable solvent for the organic ester of cellulose may be employed, for forming the solution from which the films are formed. Examples of such solvents are, acetone, mixtures of acetone, and methyl or ethyl alcohol, chloroform, ethylene dichloride, mixtures of ethylene dichloride and ethyl or methyl alcohol, methyl chloride and ethyl or methyl alcohol, etc. or mixtures of these. The organic esters of cellulose may be dissolved in the solvent in amounts of from 5 to 40 parts to 100 parts of solvent and the effect material added to the solution if same be used. This solution may then be shaped and the solvent at least partially removed.

After the sheet-like article, say foil or sheets of from 1/1000 to 15/1000 inch in thickness or other articles, are formed the same may be treated in a warm bath containing sodium, potassium or ammonium hydroxide for a period of time to either partially or completely saponify the material, or the material may be subjected to the vapors of ammonia or the material may be saponified by an acid hydrolysis method. Thus, any suitable method of saponification may be employed to form the altered cellulose ester or cellulose film, foil, sheet, etc. For examples there may be used the methods and/or reagents described in U. S. Patents Nos. 1,425,364, 1,442,631, 1,802,956, 1,818,466, 1,866,153, 1,884,622, 1,884,623, 1,895,919, 1,897,691 and U. S. applications Nos. 655,778 filed Feb. 8, 1933; 668,070 filed April 26, 1933; 709,334 filed Feb. 1, 1934; 709,335 filed Feb. 1, 1934; 709,336 filed Feb. 1, 1934; 525,612 filed March 26, 1931; 629,906 filed Aug. 22, 1932, 655,773 filed Feb. 8, 1933 and 655,774 filed Feb. 8, 1933. Although these patents and applications are primarily directed to the treatment of filaments, yarns and/or textile fabrics, the adaptation of their process and reagents to the treatment of other articles is obvious.

In one form of my invention a film of organic ester of cellulose is cast upon a film forming wheel that dips into a trough containing a saponifying agent in such a manner that the film contacts with the saponifying agent prior to removal of film from the surface upon which it is cast and in some instances prior to complete removal of the solvent of the solution from which it was cast.

By the wet method, films or foils may be extruded through suitable orifices or cast upon a suitable surface directly into a mixture of a solvent removal or precipitating agent and a saponifying agent.

As an illustration and not as a limitation the following example is given.

*Example*

The free sulphuric acid present in an unprecipitated unripened esterification charge of cellulose acetate is neutralized by the addition thereto of dry sodium acetate. The viscosity of the solution is lowered by the addition of acetone, say 100 parts of acetone to 100 parts of the primary acetylation solution that contains cellulose acetate dissolved in acetic acid. Films of about 2/1000 inch thickness are cast on a smooth surface and immediately immersed in a bath containing 10% sodium hydroxide in 90% ethyl alcohol for from 1 to 10 minutes. The time of saponification may be shortened by increasing the temperature of the bath, the concentration of the alkali and/or by the use of electrolytes. After air drying, the films are stripped from the surface upon which they were cast. This procedure results in a film of exceeding clearness and with a smooth surface. The film is pliable and possesses considerable tensile strength. Although in this example the film is not completely saponified, it nevertheless may be dyed with cotton dyes. For complete saponification resulting in a film of similar physical properties, the length of treatment in the saponifying bath may be from 4 to 30 minutes.

It is to be understood that the foregoing detailed description is merely given by way of illustration and many alterations may be made therein without departing from the spirit of my invention.

Having described my invention, what I desire to secure by Letters Patent is:

1. Process for the manufacture of sheet-like material containing cellulose, which comprises forming a mixture of an effect material and a primary solution of cellulose acetate, forming a sheet from said mixture, and treating the formed sheet with an alcoholic alkali solution to effect complete saponification of the cellulose acetate to cellulose, whereby a sheet-like material containing cellulose and having the effect material dispersed throughout the same is formed.

2. Process for the manufacture of sheet-like material, which comprises forming a mixture of cellulosic effect material and a solution of cellulose acetate, forming a sheet from said mixture, and treating the formed sheet with a saponifying agent to effect complete saponification of the cellulose acetate to cellulose, whereby a sheet-like material containing cellulose and having the effect material dispersed throughout the same is formed.

3. Process for the manufacture of sheet-like material, which comprises forming a mixture of an effect material and a solution of cellulose acetate, forming a sheet from said mixture, and treating the formed sheet with a saponifying agent to effect complete saponification of the cellulose acetate to cellulose, whereby a sheet-like material containing cellulose and having the effect material dispersed throughout the same is formed.

GEORGE SCHNEIDER.